United States Patent
Humphreys

[15] 3,647,059
[45] Mar. 7, 1972

[54] ACCESSORY RECEPTACLE

[72] Inventor: Thomas F. Humphreys, P. O. Box 886, Joliet, Ill. 60234

[22] Filed: Oct. 2, 1969

[21] Appl. No.: 863,293

[52] U.S. Cl. ........................206/58, 206/38 R, 206/52 F, 242/55.53, 242/136, 351/158
[51] Int. Cl. ............................................B65h 55/00
[58] Field of Search ................206/1 A, 15, 38, 47, 52 A, 206/52 F, 58, 6, 59 R, 59 E; 351/51, 52, 123, 158; 220/60; 215/47; 242/55.2, 55.53, 71.3, 136; 224/5 G, 28 B, 28 E

[56] References Cited

UNITED STATES PATENTS

| 878,823 | 2/1908 | McNaughton | 206/38 |
|---|---|---|---|
| 2,005,110 | 6/1935 | Ritzert | 206/52 X |
| 2,638,532 | 5/1953 | Brady | 351/158 X |
| 2,692,043 | 10/1954 | Davis | 206/38 X |
| 2,741,359 | 4/1956 | Healy | 206/38 |
| 3,063,721 | 11/1962 | Jackson et al. | 351/158 UX |
| 3,266,111 | 8/1966 | Abel | 351/158 UX |
| D212,863 | 12/1968 | Roberts | 351/158 |
| 3,390,938 | 7/1968 | Gansz | 351/158 X |
| 3,343,658 | 9/1967 | Renwick | 206/6 |
| 1,008,523 | 11/1911 | Boyle | 206/6 |
| 2,848,130 | 8/1958 | Jesnig | 215/47 X |
| 2,744,649 | 5/1956 | Smith | 215/6 X |
| 3,081,481 | 3/1963 | Nohl et al. | 150/.5 X |
| 686,324 | 11/1901 | McKay | 242/55.53 |

Primary Examiner—Joseph R. Leclair
Assistant Examiner—Steven E. Lipman
Attorney—Clarence A. O'Brien and Harvey B. Jacobson

[57] ABSTRACT

A hollow cylindrical accessory receptacle is mounted on a temple of a pair of eyeglasses. A core is axially formed in the housing and mounts a roll of lens-cleaning material. A slit is also formed in the housing which permits withdrawal and dispensing of a desired quantity of the rolled material.

3 Claims, 6 Drawing Figures

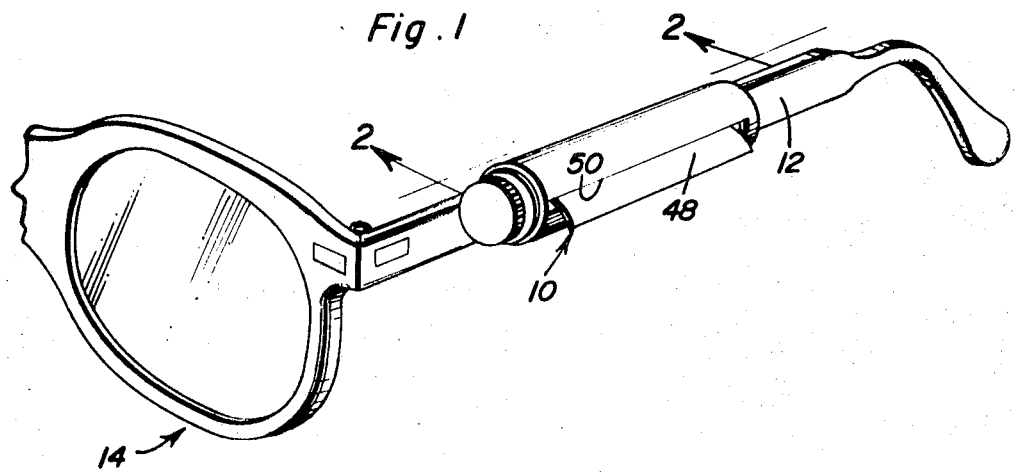
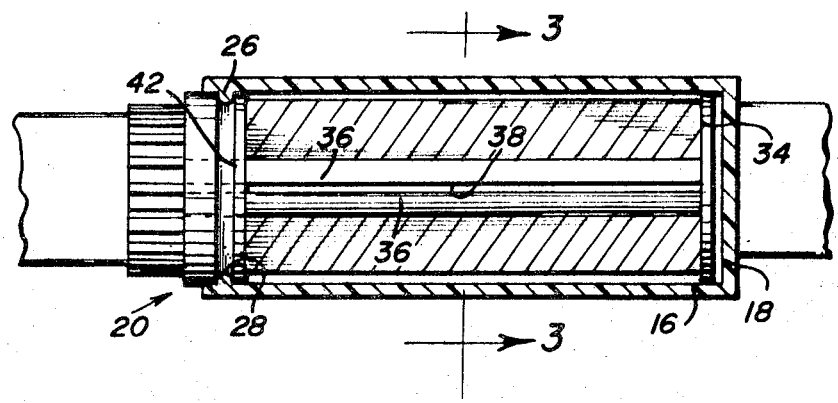
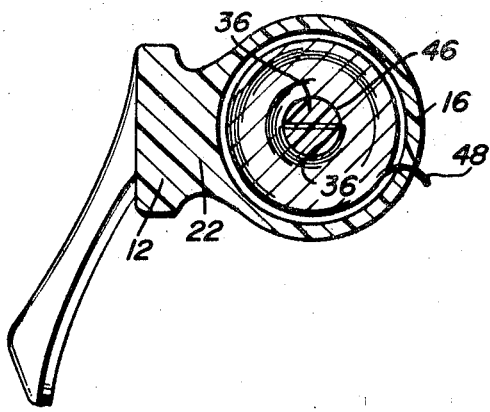
Thomas F. Humphreys
INVENTOR.

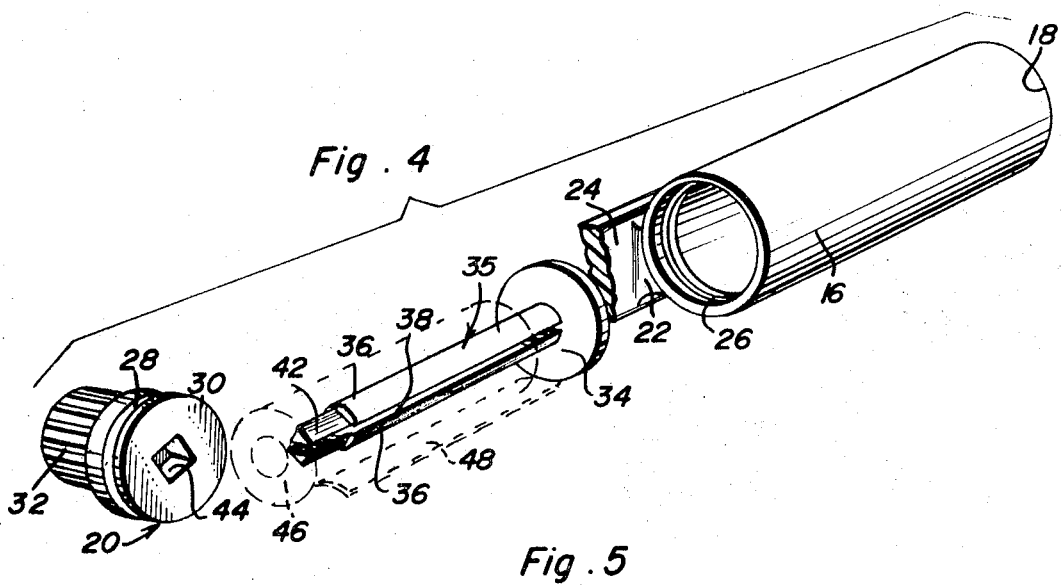
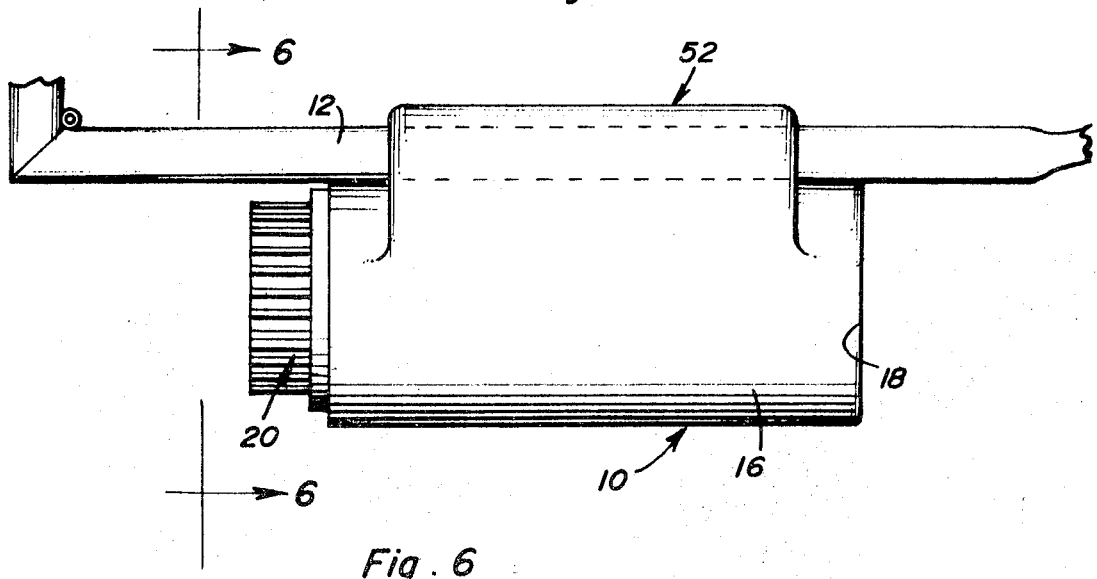
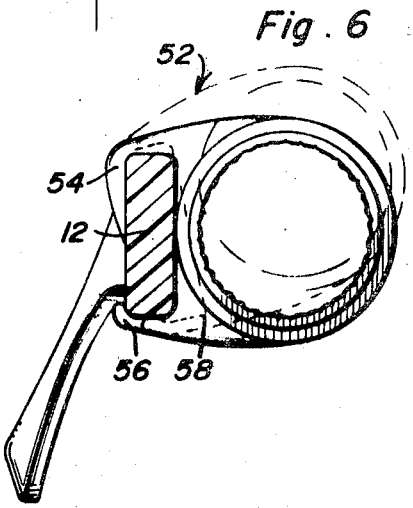
Thomas F. Humphreys
INVENTOR.

ACCESSORY RECEPTACLE

The present invention relates to novelty type receptacles and more particularly to a receptacle adapted for mounting to the temple of a pair of eyeglasses.

A large segment of the population currently wears eyeglasses and many of them allow the lenses of their eyeglasses to become smudged and dirty over prolonged periods of time. Various authoritative sources advise that such dirty lenses cause eyestrain and detract from the beneficial effect obtainable from clean lenses. Further, an individual who allows his glasses to remain dirty while wearing them may encounter an emergency situation where the reduced light reaching his eyes causes deleterious effects that would have otherwise been averted.

During the present time, several manufacturers market lens tissue having special treating materials therein for cleaning eyeglasses, the most popular being a silicon-treated eyeglass tissue marketed under the trademark "Sight Savers" and manufactured by the Dow-Corning Corporation. However, it has been the practice of eyeglass tissue manufacturers to package the tissue in bulky and awkward containers thereby defeating the manufacturer's intention of making the packaged tissue convenient for most eyeglass wearers. Individuals not using such specially treated tissue frequently utilize bathroom tissue which has a tendency to leave a film streak across the lenses. This causes irritating effects to the wearer.

The present invention takes the form of a simple and conveniently mounted receptacle connected to a selected temple of a pair of eyeglasses. The receptacle includes a cylindrical housing having rolled treated tissue contained therein. A slit is formed in the wall of the housing which permits withdrawal of the tissue as desired. Thus, by utilizing the present invention, the eyeglass wearer has treated tissue available at all times.

Although the following preferred embodiment of the present invention is directed to utilization of the temple-mounted receptacle for eyeglass cleaning tissue, it will of course be appreciated that the receptacle itself may be employed to house any small article such as a pen, pencil, and foldable or rollable material.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a partial perspective view illustrating the disposition of the present invention on the temple of an eyeglass.

FIG. 2 is a longitudinal sectional view taken along a plane passing through section line 2—2 in FIG. 1.

FIG. 3 is a transverse sectional view taken along a plane passing through section line 3—3 of FIG. 2.

FIG. 4 is an exploded view illustrating the component parts of a preferred embodiment of the present invention.

FIG. 5 is a top plan view illustrating the presently described receptacle with gripping means integrally attached thereto that permits removable mounting of the receptacle on an eyeglass temple.

FIG. 6 is an end view taken along a plane passing through section line 6—6 in FIG. 5.

Referring to the figures and more particularly FIG. 1 thereof, reference numeral 10 generally indicates the preferred embodiment of the present invention which includes a cylindrical housing or receptacle for receiving rolled material therein. By way of example, this material may be specially treated eyeglass treating tissue. The receptacle is mounted on an exterior surface of a selected temple 12 of the eyeglasses 14.

Referring to FIG. 4, the receptacle has a cylindrical shell or wall 16 having a closed end 18 and an oppositely disposed open end. The open end is closed by a removable closure 20. As seen in FIG. 4, a web 22 is integrally connected at the opposite ends thereof to the cylindrical wall 16 and a confronting surface 24 of temple 12. Immediately inward of the open housing end is an annular rib or seal 26 integrally formed with the interior surface of the cylindrical wall 16. The annular seal is adapted to engage a mating annular groove 28 in a disklike portion of the closure 20. The relationship between the annular seal and the groove is more clearly illustrated in FIG. 2 which shows the two in engagement. A knurled cylindrical handle 32 extends perpendicularly outwardly from the disklike portion thereby permitting manual manipulation of the closure 20.

In the preferred embodiment, wherein rolled material is to be stored for future dispensing, a disk 34 disposed in parallel spaced relation to the closed end 18 of the cylindrical housing perpendicularly mounts a core generally indicated by 35. The core is comprised of two semicylindrical sections 36 positioned in adjacent relation to form an overall cylindrical core having a longitudinally extending slit 38 down the middle of the core.

The end portion 42 of the core, opposite the core end attached to disk 34 is shaped in a form having a slitted square cross section. This squared portion is adapted to be received within a square recess 44 formed in the free surface of the disk portion 30 of closure 20. Thus, the squared portion 42 and the recess 44 serve as a key connection when the core is positioned in the housing and the closure 20 is positioned in the opened end as illustrated in FIG. 2.

As illustrated in FIGS. 2 and 4, the core 35 mounts a roll of material 46 thereon having an outward edge 48. A first transverse edge of the roll abuts the disk member 34 while the opposite end of the roll abuts the surface of closure 20 that has the recess 44 formed therein.

Referring to FIG. 1, an elongated slit 50 is formed in spaced relation to the axis of the cylindrical housing. The roll 46 is positioned in the housing so that the end 48 of the roll may be pulled through the slit 50 whereupon the roll may be pulled to dispense a desired quantity of sheet material. As will be appreciated, the closure 20 is opened to allow removal of the core and replenishment of the roll material, when the latter is expended.

In a second form of the invention, shown in FIGS. 5 and 6, gripper means 52 are shown to removably retain the housing 16 on a temple 12 instead of the permanent attachment shown in FIG. 4. The gripper means 52 has a first hooked arm 54 integrally formed and extending from the wall 16 to engage the upper edge and the back edge of temple 12. A second oppositely disposed gripper arm 56 frictionally engages the lower edge and the back edge of the temple 12. However, as will be noted in FIG. 6, the lower gripper arm is shorter than the upper gripper arm so that upon upward twisting displacement of the cylindrical housing, frictional engagement between the lower arm 56 and the temple will be released thereby permitting the freeing upward displacement of the receptacle thereby removing the same from the temple. The freeing position is indicated by 58 in FIG. 6. In the preferred embodiment of the present invention, the receptacle is fabricated from a plastic material which permits relatively effortless removal of the receptacle from the temple as just explained.

The core and material roll may be excluded from the receptacle thereby permitting the insertion of any small object therein. By so doing, the eyeglass wearer is able to carry small objects with him wherever he goes while wearing his glasses.

Further, although the preferred embodiment is explained in terms of a longitudinally slitted receptacle, it is contemplated to have a receptacle with an open top allowing one to drop in the roll of material and dispense the material by thumb manipulation.

The foregoing is considered as illustrative only of the principles of the invention. Further, since numerous modifications and changes will readily occur to those skilled in the art, it is not desired to limit the invention to the exact construction and operation shown and described, and accordingly all suitable modification and equivalents may be resorted to, falling within the scope of the invention.

What is claimed as new is as follows:

1. For use on an exterior surface of one of the temples of a pair of eyeglasses, an accessory receptacle comprising an elongated hollow housing closed at a rearward end, open at a forward end, and provided along an exterior lengthwise surface with integral mounting means which is substantially commensurate in length with the length of said housing and by way of which said housing can be supportively and accessibly mounted on the exterior surface of said temple, the hollow portion of said housing providing a receptacle, an interior portion of said housing inwardly of said open end being provided with an annular rib constituting a closure retainer and seal therefor, a manually applicable and removable closure for said open end, said closure embodying an inward disklike portion which is telescopingly plugged into the open end portion of said housing and has a peripheral surface provided with an annular groove into which said rib is retentively but removably fitted, said closure having an outer accessible end portion which is provided with an outstanding handle, said handle serving to enable the user to readily apply and remove the closure and also turn it relative to the housing, and, in combination, a roll of sheet material expressly suitable for treating, wiping, and cleaning the lenses of said eyeglasses, and means for storing, reeling, and dispensing said sheet material, said means being fitted and confined in said receptacle portion, being insertable and removable and retained in its given position by said closure, said housing being provided with a discharge slit by way of which a free end portion of said sheet material is capable of being withdrawn for use.

2. The accessory receptacle defined in and according to claim 1, and wherein said storing, reeling, and dispensing means comprises an axial core, said core providing a spindle on which said roll of sheet material is wound, said core being provided at a terminal rearward end with a disc which is parallel to the adjacent closed end of said housing and serves to orient and mount the core for supportive axial rotation in said receptacle portion.

3. The accessory receptacle defined in and according to claim 1, and wherein said storing, reeling, and dispensing means comprises an axial core, said core providing a spindle on which said roll of sheet material is wound, said core being provided at a terminal rearward end with a disk which is parallel to the adjacent closed end of said housing and serves to orient and mount the core for supportive axial rotation in said receptacle portion, an axial enclosed part of said disk portion having a noncircular recess formed therein and the forward end of said core having a corresponding noncircular terminal end which is telescopingly but removably keyed in said recess so that when the closure is turned by hand said core and disk is simultaneously turned in a manner to feed the free end of said sheet material through and beyond said slit for use.

* * * * *